United States Patent
Junkers

(10) Patent No.: US 6,609,868 B2
(45) Date of Patent: Aug. 26, 2003

(54) WASHER, FASTENER PROVIDED WITH A WASHER, AND METHOD OF FASTENING WITH THE USE OF THE WASHER

(76) Inventor: John K. Junkers, 8 Stonewall Rd., Saddle River, NJ (US) 07458

(*) Notice: Subject to any disclaimer, the term of this patent is extended or adjusted under 35 U.S.C. 154(b) by 0 days.

(21) Appl. No.: 10/010,377

(22) Filed: Dec. 6, 2001

(65) Prior Publication Data

US 2003/0108404 A1 Jun. 12, 2003

(51) Int. Cl.$^7$ .......................... F16B 33/00; F16B 43/00
(52) U.S. Cl. ..................... 411/368; 411/512; 411/533
(58) Field of Search ................................. 411/368, 369, 411/10–12, 533, 542, 512

(56) References Cited

U.S. PATENT DOCUMENTS

| | | | | |
|---|---|---|---|---|
| 3,627,334 A | * | 12/1971 | Reddy | 411/542 X |
| 4,191,389 A | * | 3/1980 | Jelinek | 411/542 |
| 4,702,657 A | * | 10/1987 | Jelinek | 411/533 X |
| 4,892,000 A | * | 1/1990 | Renk et al. | 411/533 X |
| 5,341,560 A | | 8/1994 | Junkers | |
| 5,946,789 A | | 9/1999 | Junkers | |
| 6,254,323 B1 | | 7/2001 | Junkers | |

* cited by examiner

Primary Examiner—Neill Wilson
(74) Attorney, Agent, or Firm—Michael J. Striker

(57) ABSTRACT

For assembling two parts of an object with one another a threaded fastener is used which has a bolt having a thread and an axis and introducable Into the at least two parts forming an object, a nut screwable on the bolt, and a washer to be applied between the nut and the object, the washer having an axis and being provided with a first bearing face surface located at one axial side and adapted to cooperate with the nut, a second bearing face surface located at an opposite axial side and adapted to cooperate with the object, and a third turning resistant surface adapted to cooperate with a bolt with the thread of the bolt, so that when the nut is turned with a given force in one direction and the washer receives simultaneously a given force in an opposite direction, only the nut turns to tighten or loosen the bolt and the washer remains rotation stationary while the bolt elongates or relaxes in an axial direction.

2 Claims, 7 Drawing Sheets

WASHER, FASTENER PROVIDED WITH A WASHER, AND METHOD OF FASTENING WITH THE USE OF THE WASHER

BACKGROUND OF THE INVENTION

The present invention relates to a fastener provided with a washer, and a method of fastening with the use of the water.

It is known to fasten objects with one another with a fastener which has a multi-part replacement nut, for example including an inner sleeve, an outer sleeve, and a washer. Such a replacement nut is disclosed for example in our U.S. Pat. No. 5,341,560. Another replacement nut is disclosed in our U.S. Pat. No. 6,254,323 in which a bolt has a spline underneath its upper thread, to which a washer is non-rotatably connected, and the bolt also has engaging means for applying a reaction force, while an active force of the same tool turns the nut on the bolt thread and the washer face. In the fastener disclosed in both above mentioned patents, the common features are the use of the action and reaction force of one tool, the elimination of reaction arms on torque power tools, the conversion of torque to torsion-free bolt stretching and obtaining for the first time the desired residual bolt load as compared to torque, which is estimated based on calculated frictions rather than actual frictions or hydraulic tension, which is based on estimated bolt relaxation when the force is transmitted from the elongated bolt to the hand-tight nut.

The problem found in the industry with the fastener disclosed in U.S. Pat. No. 5,341,560 is that, since the nut has to be made with two sleeves whose outside diameter has to meet the outside diameter of a regular nut, both sleeves have less material than a regular nut. This requires the use of high strength materials, which causes a reluctance on the part of the customers to change materials and fear of the unknown. In the fastener disclosed in U.S. Pat. No. 6,254,323 the bolt needs to be altered, which is not just costly but not easily acceptable by the industry. In other words the fastener disclosed in our U.S. Pat. No. 5,341,560 requires alteration of the nut, while the fastener disclosed in our U.S. Pat. No. 6,254,323 requires alteration of the bolt. In addition, both versions are expensive to produce, adding to customer's reluctance to purchase these fasteners.

SUMMARY OF THE INVENTION

Accordingly, it is an object of the present invention to provide a fastener provided with a washer, and a method of fastening with the use of the washer, which avoid the disadvantages of the prior art.

In accordance with the invention, one feature of present invention resides in a threaded fastener for connecting at least two parts which constitute an object, which fastener has a bolt having a thread; a nut screwable on the bolt; and a washer to be applied between a nut and an object and having a body with an axis and with a first bearing face surface located at one axial side and adapted to cooperate with a nut, a second bearing face surface located at an opposite axial side and adapted to cooperate with an object, and at least one third turning resistance surface adapted to cooperate with a thread of the bolt, so that when the nut is turned with a given force in one direction and the body of the washer receives simultaneously said given force in an opposite direction, only the nut turns to tighten or loosen the bolt and the body of the washer remains rotation stationary, while the bolt elongates or relaxes in an axial direction.

Still another feature of the present invention resides in a method of assembling at least two parts with one another, comprising the steps of introducing a bolt having a thread into the at least two parts so that a free end of the bolt extends outwardly beyond at least one side of the two parts; placing a friction washer on said free end portion of said bolt so that said friction washer engages with said thread of said bolt to create a turning friction between said washer and said bolt and so as to abut against said at least one side of the at least two parts; threadably connecting a nut to said free end portion of said bolt so as to abut against the friction washer and to form an assembly; placing a torque power tool on the assembly so as to tighten or loosen the nut with a turning portion of said torque power tool connected to the nut to overcome a threaded friction between the bolt and a facial friction with the friction washer to turn the nut, and with a reaction portion of the torque power tool connected to the washer to absorb a reaction force due to a facial friction of the friction washer with the nut, a facial friction of the washer with said at least one side of the two parts and a turning friction of the washer with the bolt selected so that the washer remains stationary while the bolt elongates or relaxes in an axial direction.

When the fastener is designed in accordance with the present invention and the method is performed in accordance with the present invention, regular nuts and regular bolts can be used. In other words the customer can use whatever he has adding merely a washer. The benefit is quite remarkable. First of all the product is much less expensive than each of the products in the above mentioned patents. Secondly, the customer uses his approved bolts and nuts. Third, instead of reacting on a part of the nut directly as in the U.S. Pat. No. 5,341,560 or indirectly as in the U.S. Pat. No. 5,946,789 by passing the reaction force through the washer to a part of the nut, the reaction force is solely absorbed by the washer. Furthermore, the solution proposed in the present application provides the identical benefits as the solutions disclosed in the above mentioned patents, one of which is a torsion-free elongation of the free portion of the bolt, a known coefficient or friction between the nut face and the washer face and thus a known bolt load precision, a reaction-arm free hydraulic torque tool use, a bridge-and precision puller-free bolt stretching. In other words, torque is converted into torsion- and side-load-free bolt elongation to the desired bolt load by means of a torque power tool, which can be also applied to torque regular nuts with a reaction member. It needs to be considered that most bolts in the industry are through bolts with a nut on the other side or blind bolts threaded in the bottom part of the two parts.

It is known that if a torque power tool is applied to a fastener in a way where the nut is turned by the active force of the torque power tool and the reaction is absorbed by a regular washer underneath the nut, then either the nut or the washer will turn at will or the bolt turns along with the nut and nothing is accomplished, or the bolt end tightens further into the blind hole causing the bottom threads to mushroom which makes disassembly extremely difficult. The reason for that is that the nut has two friction areas, the threaded connection with the bolt which creates a drag friction and the facial area with the washer, whereby the washer has one facial area with the nut and one facial area with the two parts to be assembled. In other words, both have two friction areas. While it is correct that a threaded friction is a little less than a facial friction, the difference is minute as the facial friction between the washer and the nut balance each other out, so that there is merely one minute difference between the nut and the washer. At the same time if the bolt is a through bolt, the thread friction between the bolt and the nut is such that the bolt turning resistance is much less than the facial friction of the washer and while the washer would absorb the reaction force without turning, the bolt would turn along with the nut and nothing is accomplished unless a back-up wrench is used to stop the bottom nut from turning. Therefore, neither is enough to guarantee that only the nut turns, which is why the third friction area had to be introduced to the washer.

On the other hand, if the washer is connected with the thread of the bolt, the bolt can not turn along with the nut because the washer will have to lift up which it can not because the nut is on top of it. Bolt elongation resulting from turning down the nut is, therefore, impossible. The present invention therefore provides a bolt thread engaging washer section which is connected with the bolt thread. This alone would not help because this section could move either along with the bolt by rotating or upward if the bolt rotates in it and nothing is accomplished. This in turn would allow the bolt to turn along with the nut as the section rotates or moves up. Therefore in accordance with a further new feature of the present invention, the bolt thread engaging means is frictionally connected with the body of the washer, so that its rotational or upward movement is subject to overcoming a friction greater than a drag friction created on the bolt by the turning nut, to stop the bolt from turning. This friction in conjunction with the two facial frictions of the washer assure that the bolt does not move along with the nut, that the bolt is stretched, and that the washer and its bolt thread engaging section do not rotate while the nut is being turned.

If the reaction force of the tool is applied to the outside of the washer through engagement means thereon, it is also possible to have a pin or the like connected at one end to the thread engagement section and having its other end sticking out of the circumference of the washer so that when the tool is connected with the washer the pin is pushed inwardly pushing the thread engagement section inwardly into the bolt thread.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
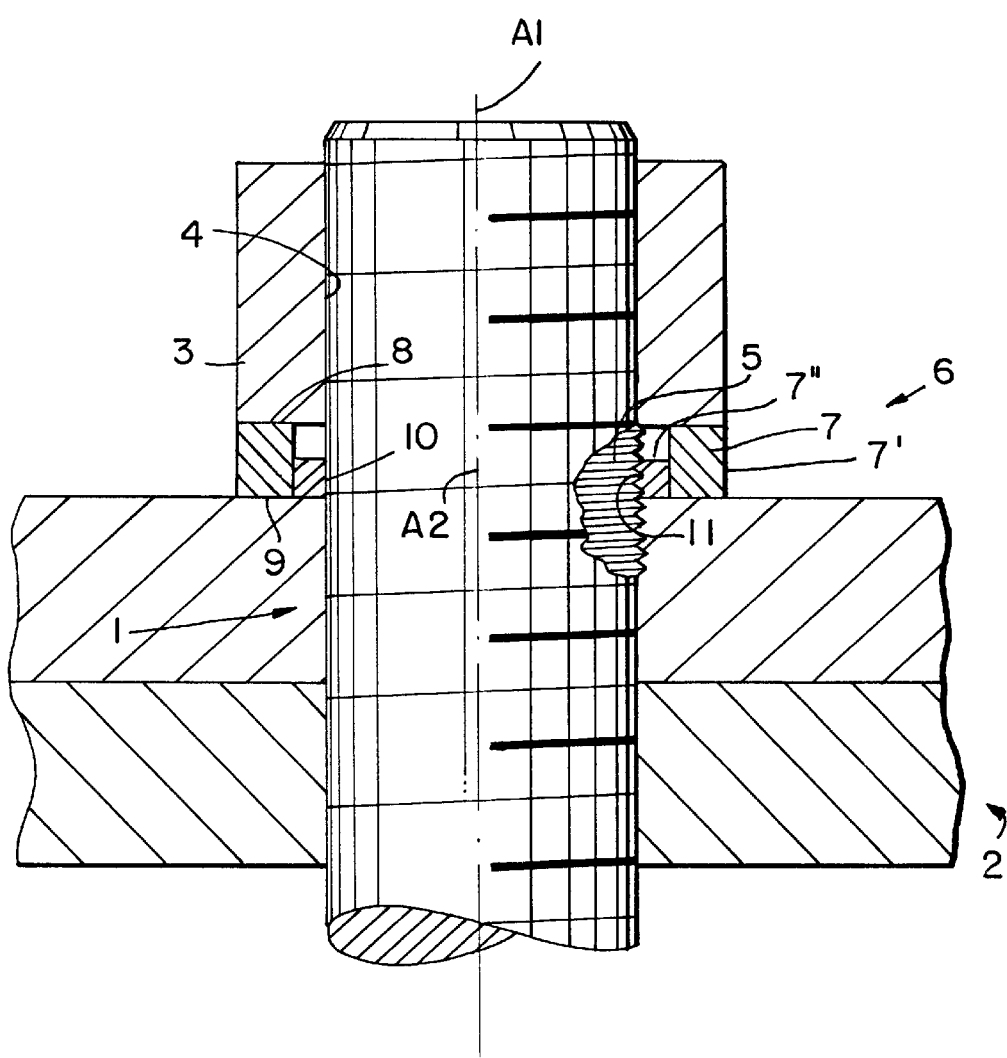
FIGS. 1, 1a, 1b, 2, 3, 3a, 4a, 4b, 4c, 5a, 5b, 6a, 6b are views of a threaded fastener provided with a washer in accordance with various embodiments of the present invention.

FIG. 1 shows a threaded fastener which has a bolt identified with reference numeral 1 and introducible into an object which is composed for example of two parts to be assembled with one another as identified with reference numeral 2. The fastener further has a nut which is identified with reference numeral 3. The nut is provided with an inner thread 4 which is screwed on an outer thread 5 of the bolt 1.

The threaded fastener further has a washer which is identified as a whole with reference numeral 6. The washer 6 has a body identified with reference numeral 7 which is provided with a first upper bearing face surface 8 cooperating with the nut 3, a second lower bearing face surface 9 cooperating with the object 2 or in particular with a surface of one of the parts to be assembled with one another, and at least one turning resistant surface which is identified with reference numeral 10. The first and second bearing face surfaces are spaced from one another in an axial direction or in other words in a direction of an axis A1 of the washer which coincides with an axis A2 of the bolt. The at least one third turning resistant surface 10 is located radially inwardly of the body 7 of the washer 6. The third turning resistant surface 10 is formed so as to engage with or wedge in the thread 5 of the bolt 1, for example by providing a corresponding thread 11 on the turning resistant surface 10.

As shown in FIG. 1, the body 7 is composed of two parts 7' and 7" which are located radially adjacent to one another, so that the part 7" is located radially inwardly of the part 7'. The turning resistant surface 10 with the bolt thread engaging means 11 is provided radially inwardly on the part 7". The parts 7' and 7" are connected with one another so as to avoid turning relative to one another, but to permit a movement relative to one another in an axial direction. For this purpose, the parts 7' and 7" can be frictionally connected with one another, for example by being press-fit to create a greater resistance toward movement than the turning force applied by the bolt and so as to stop the bolt from turning along with the nut and permitting an axial movement of the part 7" relative to the part 7' when the bolt is pulled up by the turning nut.

Figure 1A:
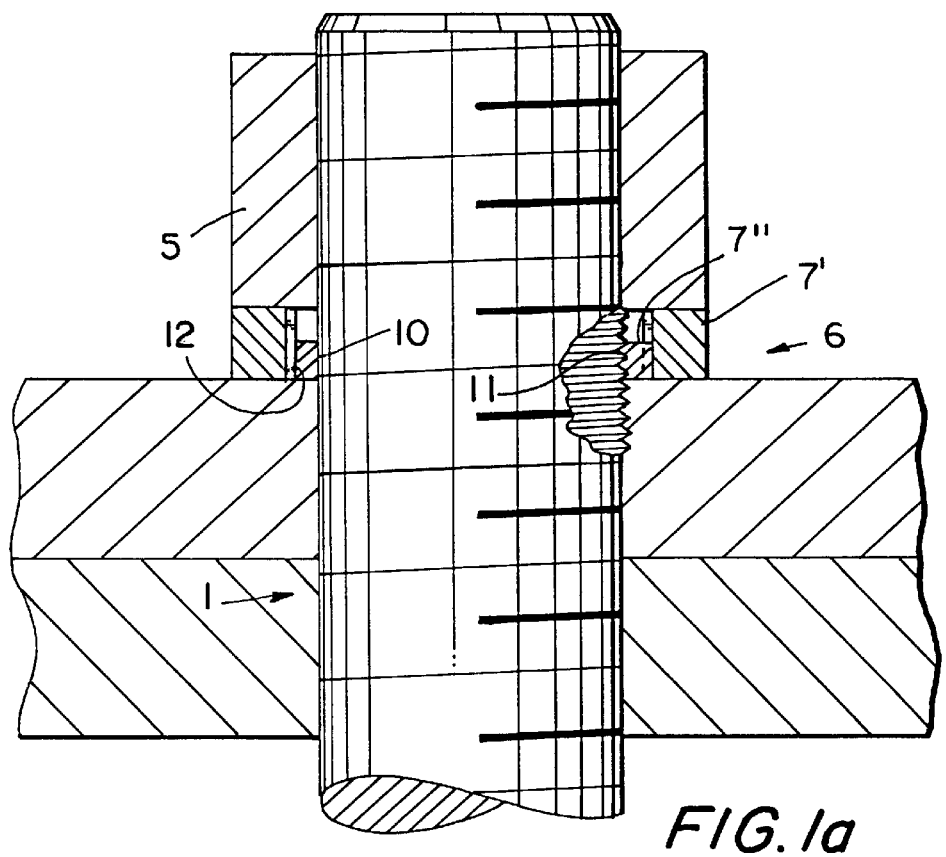

In the embodiment shown in FIG. 1a the turning of the part 7" relative to the part 7' is stopped by interengaging splines 12, for example provided on the radially outer surface of the part 7" and the radially inner surface of the part 7', which permits the axial movement of the part 7" only.

Figure 1B:
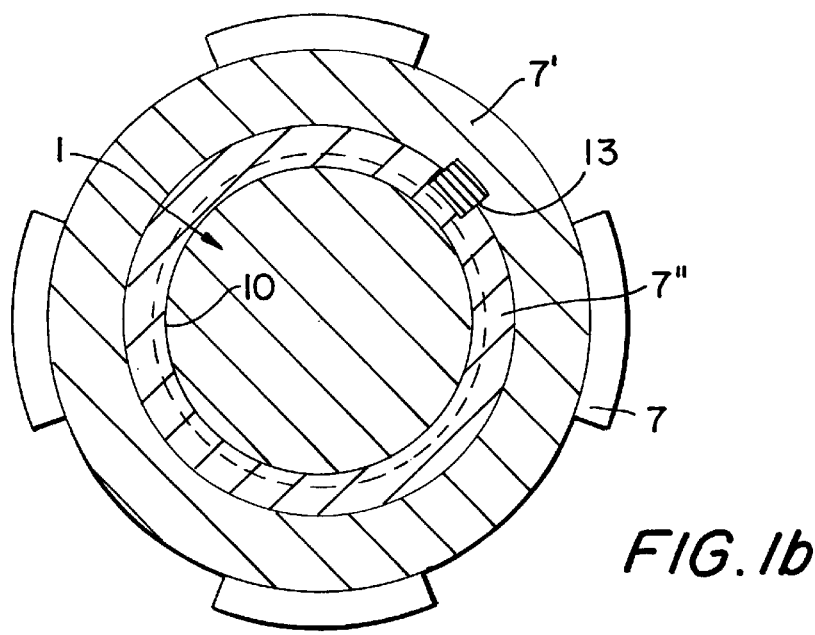

In the embodiment shown in FIG. 1b the turning of the part 7" relative to the part 7' is prevented for example by a key 13 which permits axial movement between the parts 7' and 7" only.

Figure 2:
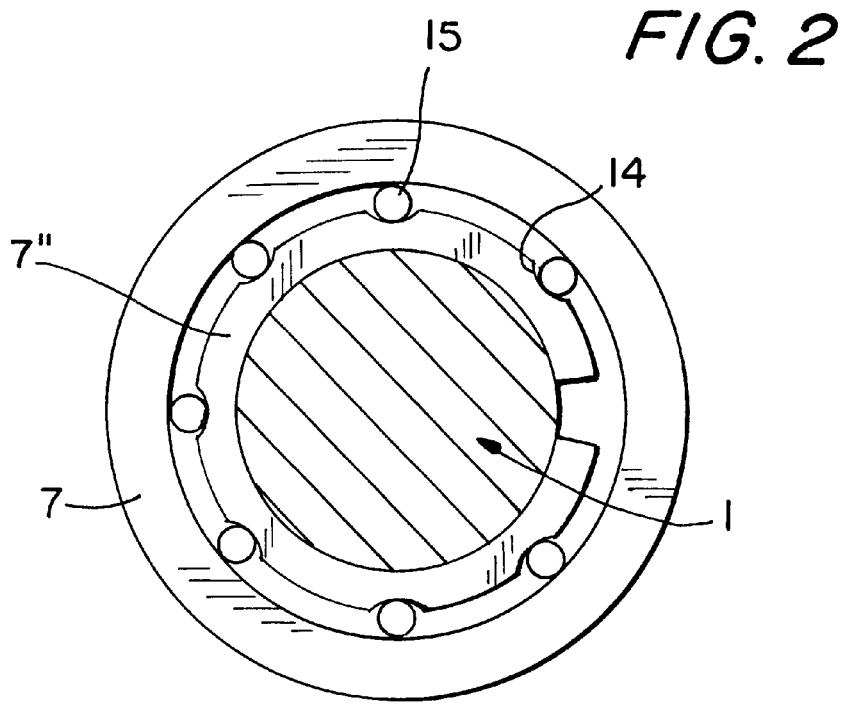

As shown in FIG. 2 the part 7" can be for example formed as a split ring, and its radially outward surface can have inwardly rounded pockets 14 extending in the axial direction and radially inward surface of the part 7' can contain pins 15 which are coaxial with the bolt axis and which sit partially in the pockets. They force the split ring inwardly into the bolt thread if a turning motion is introduced into the part 7' and/or the 7", while limiting the turning between the parts 7' and 7" and also adding a further friction to the movement of the part 7' and 7" relative to one another in the axial direction.

Figure 3:
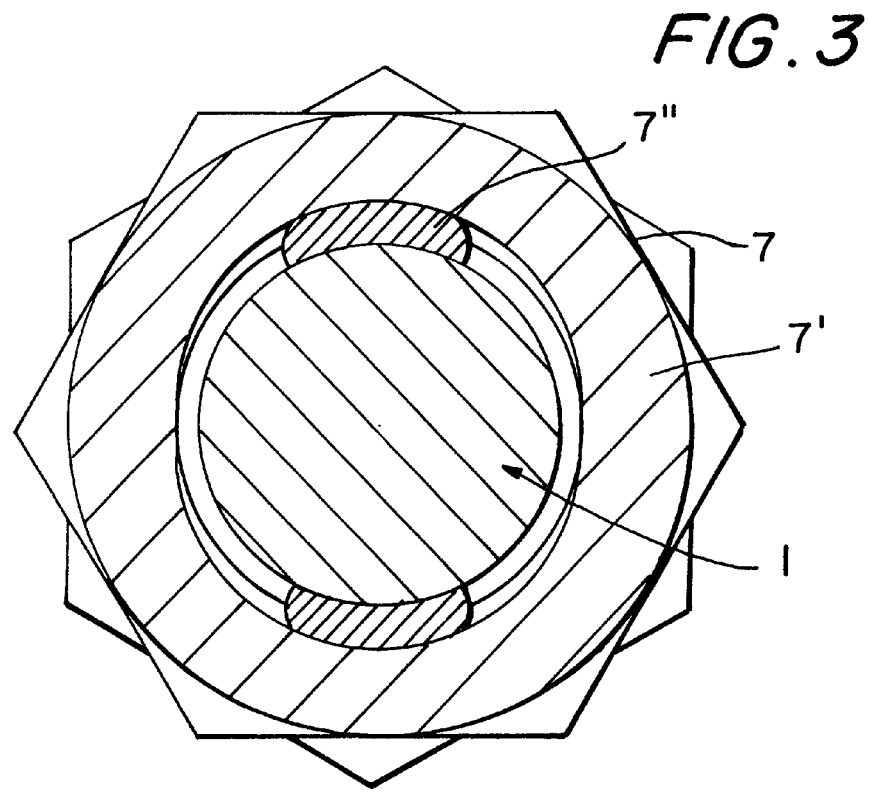

As shown in FIG. 3 the part 7' can have an oval inward surface whose rounded portion has a given dimension, while the part 7" can have at least one ring section engaging the bolt thread and located in the rounded portion by another dimension. Therefore the ring section is forced inwardly into the bolt thread if a turning motion is introduced to the part 7' and/or the part 7" in either direction, while adding restrictions to the movement of the part 7' and the part 7" relative to one another.

Figure 3A:
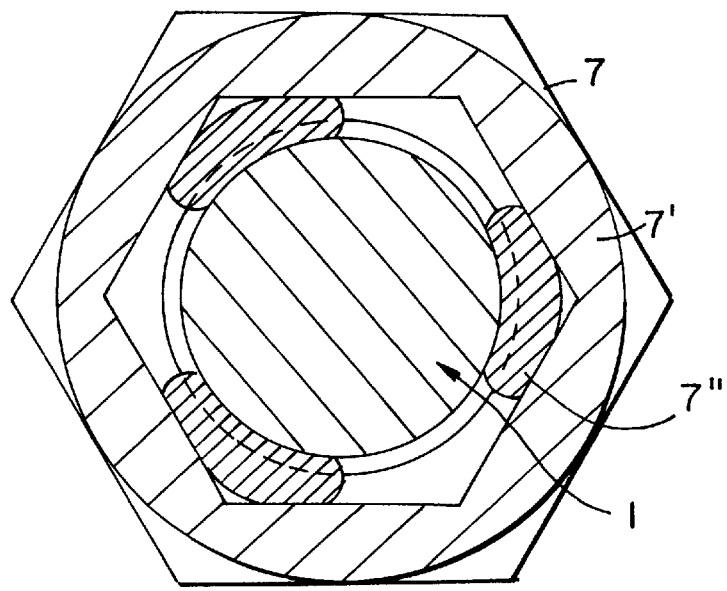

In accordance with a further embodiment shown in FIG. 3a, the part 7" can be other than round or oval. It can have a shape which is different from the round or oval shapes.

Figure 4A:
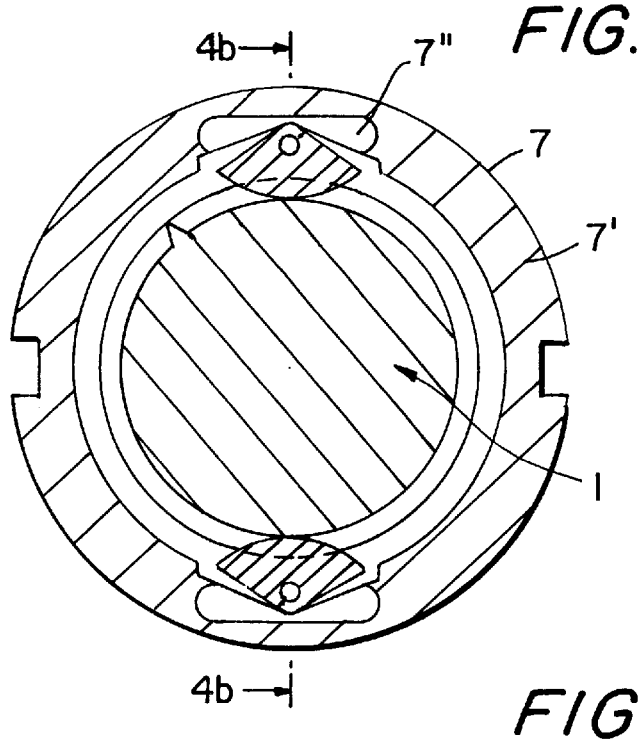
Figure 4B:
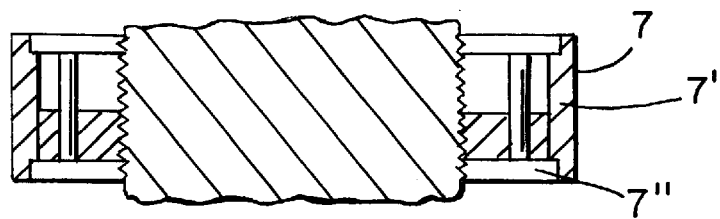

As shown in FIG. 4, the part 7" can be at least one part which for example has one of its sides banking on the inward surface of the part 7' and formed to restrict the turning motion of the part 7". It has its outer side engaging with the bolt thread and formed with increasing radius relative to the above mentioned one side, so as to turn within its restrictions and thus engage more and more the bolt thread with its outer side, while squeezing more and more with its other side against the inward surface of the part 7' to increase its friction with the part relative to the axial movement of the part 7".

Figure 4C:
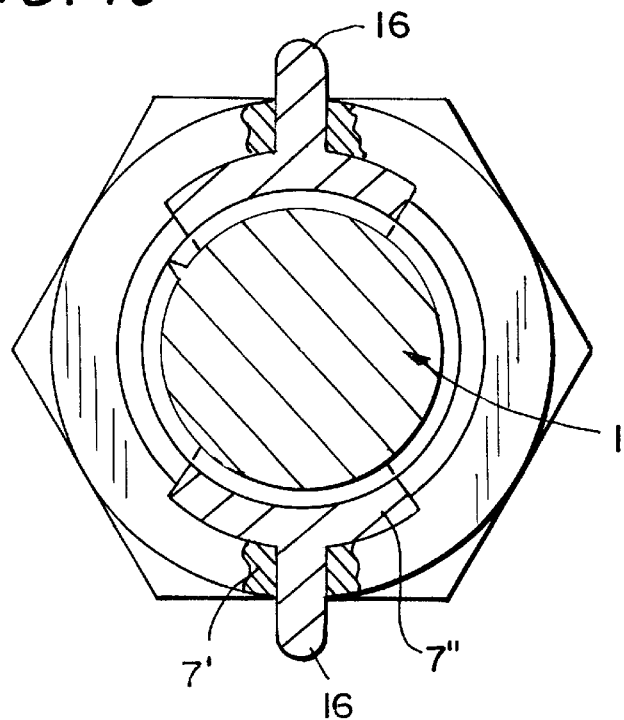

In the embodiment of FIG. 4c a pin 16 sits for example on the part 7 and extends outwardly through the part 7' to extend beyond the outer circumference of the part 7'. Therefore when the engaging means of the tool are connected to the engaging means of the part 7' the pin 16 is pushed inwardly to push the thread engaging section into the bolt thread, so that the washer can be placed on the bolt without requiring the turning of the washer down the extending bolt threads and so that the axial movement of the thread engaging section is subject to overcome the friction between it and the pin 16.

Figure 5A:
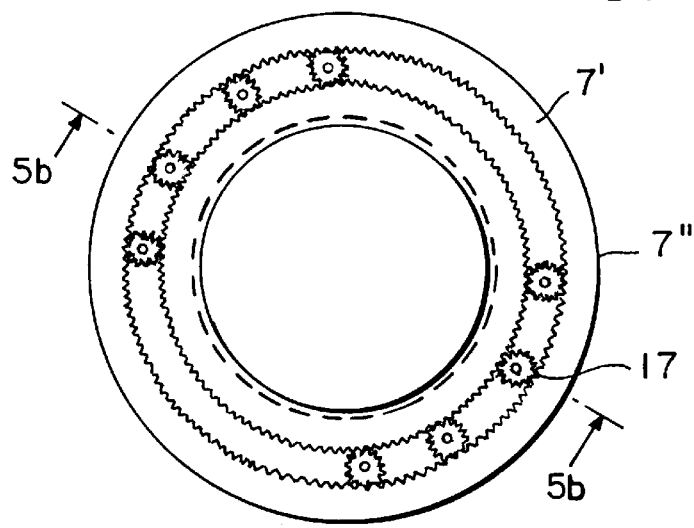
Figure 5B:
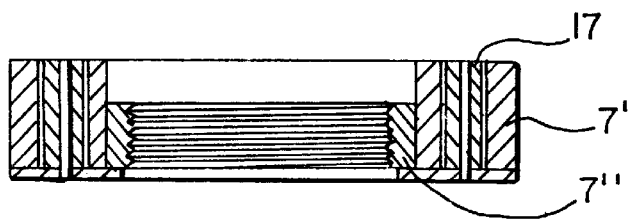

In the embodiment of FIG. 5 the washer is formed so as to stop the bolt and the washer from turning along with the nut when the nut is turned by a power tool. Therefore, a turning resistant portion 7" of the washer 7 has for example a ring having an inward side engaging in the bolt thread and an outward side having a gear teeth to turn a gear engaging in the gear teeth of the ring and also engaging in the inward side of the washer body with the two facial friction areas. The gear 17 is connected to a plate between the washer body and the object. When the bolt turns along with the nut, the turning resistant portion of the washer wants to turn along in the same direction trying to turn the gear which in turn tries to turn the washer body in the opposite direction to the drag friction applied to its bearing face surface by the nut, so that the bolt and the washer with its parts remains rotation stationary while the nut is turned.

Figure 6A:
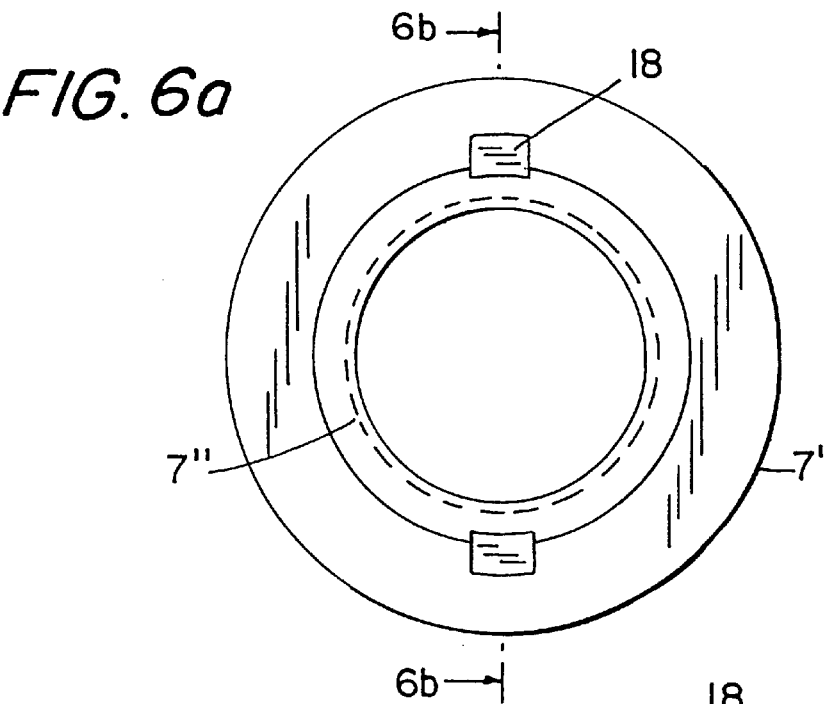
Figure 6B:
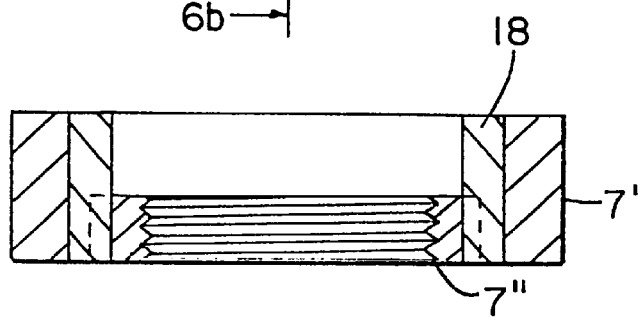

In the embodiment of FIG. 6 the washer is formed so as to stop the bolt from turning in the turning resistant portion of the part 7" by providing at least one wedge-shaped part 18 between the parts 7' and 7". It stops the part 7" from turning in the part 7' so that the drag force of the turning bolt can only rise the turning resistant portion of the washer which, however, wedges it further into the bolt thread until the bolt stops turning and the turning resistant surface moves only axially with the bolt.

Figure 7:
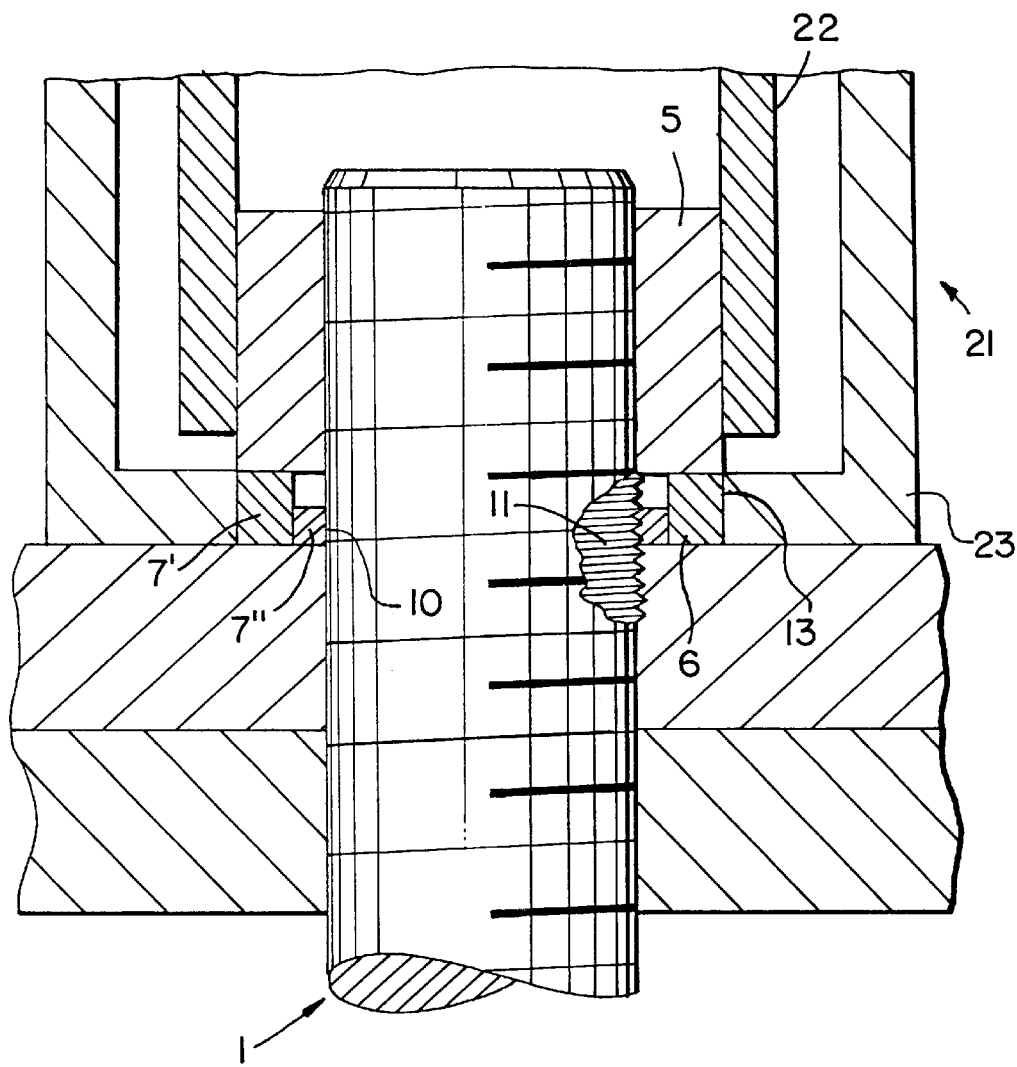
FIG. 7 is a view illustrating a fastening process with the use of the fastener and the washer in accordance with the present invention, and a torque power tool.

When as shown in FIG. 7, a torque power tool 21 is placed on the fastener so as to tighten or loosen the nut 5, a turning portion 22 of the torque power tool 21 is connected to the nut 5 and turns the nut to overcome the thread friction with the bolt 1 and the facial friction with the washer 6 to turn the nut 5, while a reaction portion 23 of the torque power tool 21 is connected to the washer 6 to absorb the reaction force due to the facial friction of the washer 6 with the nut 5, its facial friction with one side of the parts 2, and its turning friction with the bolt 1, so that the washer 6 and the bolt 1 do not turn, but absorb the reaction force of the torque power tool.

It is to be understood that in order to engage the nut 5 by the turning part 22 of the torque power tool 21, the nut must have corresponding connecting means formed, for example as a polygonal shape of the outer surface of the nut, as splines provided on the outer surface of the nut, etc. On the other hand, in order to connect the reaction portion 23 of the torque power tool 21 to the washer 6, the washer also must be provided with connecting means formed for example also as a polygonal outer surface of the washer, or as a plurality of splines of the outer surface of the washer, etc. as identified with reference numeral 13.

The lower bearing face surface 9 of the body of the washer can be formed to have a high friction relative to the object, for example, roughened.

In accordance with the invention it is also possible that the bolt thread engaging means have a different angle than a thread of the bolt, to create a greater friction between it and the bolt thread.

It is also possible that the bolt thread engaging means is not threaded, but have a surface softer than a surface of the bolt to cause friction.

It will be understood that each of the elements described above, or two or more together, may also find a useful application in other types of constructions differing from the types described above.

While the invention has been illustrated and described as embodied in washer, fastener provided with a washer, and method of fastening with the use of the washer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A threaded fastener for connecting at least two parts which constitute an object, comprising a bolt having a thread and an axis and introducable into the at least two parts forming an object; a nut screwable on said bolt; and a washer to be applied between said nut and said object, said washer having an axis and being provided with a first bearing face surface located at one axial side and adapted to cooperate with said nut, a second bearing face surface located at an opposite axial side and adapted to cooperate with said object, and a third turning resistant surface adapted to cooperate with a bolt with said thread of said bolt, so that when said nut is turned with a given force in one direction and said washer receives simultaneously a given force in an opposite direction, only said nut turns to tighten or loosen said bolt and said washer remains rotation stationary while said bolt elongates or relaxes in an axial direction.

2. A method of assembling at least two parts with one another, comprising the steps of introducing a bolt having a thread and an axis into the parts so that a free end portion of the bolt extends outwardly beyond at least one side of the two parts; placing a friction washer on said free end portion of said bolt so that said friction washer engages with said thread of said bolt to create a turning friction between said washer and said bolt and so as to abut against said at least one side of the parts; threadably connecting a nut to said free end portion of said bolt so as to abut against the friction washer and to form an assembly; placing a torque power tool on the assembly so as to tighten or loosen the nut with a turning portion of said torque power tool connected to the nut to overcome a threaded friction with the bolt and a facial friction with the friction washer to turn the nut, and with a reaction portion of the torque power tool connected to the washer to absorb a reaction force due to a facial friction of the friction washer with the nut, a facial friction of the washer with said at least one side of the two parts and a turning friction with the bolt selected so that the washer does not turn but absorbs the reaction force of the torque power tool and so that the bolt elongates or relaxes in an axial direction.

* * * * *